United States Patent
Hashimoto (10) Patent No.: US 11,806,913 B2
(45) Date of Patent: Nov. 7, 2023

(54) HEAD FOR MULTI-LAYER EXTRUSION DEVICE

(71) Applicant: Nakata Engineering Co., Ltd., Hyogo (JP)

(72) Inventor: Takeshi Hashimoto, Kobe (JP)

(73) Assignee: Nakata Engineering Co., Ltd., Hyogo (JP)

( * ) Notice: Subject to any disclaimer, the term of this patent is extended or adjusted under 35 U.S.C. 154(b) by 290 days.

(21) Appl. No.: 17/419,033

(22) PCT Filed: Nov. 6, 2019

(86) PCT No.: PCT/JP2019/043495
§ 371 (c)(1),
(2) Date: Jun. 28, 2021

(87) PCT Pub. No.: WO2020/144925
PCT Pub. Date: Jul. 16, 2020

(65) Prior Publication Data
US 2022/0080644 A1   Mar. 17, 2022

(30) Foreign Application Priority Data
Jan. 11, 2019   (JP) .................................. 2019-003068

(51) Int. Cl.
*B29C 48/495*   (2019.01)
*B29C 48/305*   (2019.01)
(Continued)

(52) U.S. Cl.
CPC ............ *B29C 48/495* (2019.02); *B29C 48/07* (2019.02); *B29C 48/21* (2019.02); *B29C 48/305* (2019.02);
(Continued)

(58) Field of Classification Search
CPC .............................. B29C 48/49; B29C 48/495
See application file for complete search history.

(56) References Cited

U.S. PATENT DOCUMENTS 2,897,543 A   8/1959   Weston et al.
3,902,835 A *   9/1975   Theysohn ............... B29C 48/08
425/467

(Continued)

FOREIGN PATENT DOCUMENTS

EP   2 566 677 B1   1/2018
JP   S54-058762 A   5/1979
(Continued)

OTHER PUBLICATIONS

Machine translation of JP S6119331, retrieved from EPO database Jun. 8, 2023 (Year: 2023).*

*Primary Examiner* — Timothy Kennedy
(74) *Attorney, Agent, or Firm* — Studebaker & Brackett PC (57) ABSTRACT

Provided is a head for a multi-layer extrusion device which can be easily and accurately adjusted to a change in size of an extruder and a change in extrusion shape. A head 1 for a multi-layer extrusion device is provided with a plurality of flow paths for separately guiding elastomer materials G from a plurality of extruders 2 to a pre-former attachment unit. The head 1 comprises: a main head 10 to which each extruder 2 is connected; an upper head part 11 positioned above the main head 10; and a lower head part 12 positioned below the main head 10. The plurality of extruders 2 include a first extruder 5 and a second extruder 6. The main head 10 is detachably divided into at least: a first head part 15 to which the first extruder 5 is connected; a second head part 16 to which the second extruder 6 is connected; a third head part 17 connected to the first head part 15 on the downstream (Continued)

side of the first head part 15; and a fourth head part 18 connected to the second head part 16 on the downstream side of the second head part 16.

13 Claims, 5 Drawing Sheets

(51) Int. Cl.
   *B29C 48/07*   (2019.01)
   *B29C 48/21*   (2019.01)
   *B29K 21/00*   (2006.01)
   *B29L 30/00*   (2006.01)

(52) U.S. Cl.
   CPC ..... *B29K 2021/00* (2013.01); *B29L 2030/002* (2013.01)

(56) References Cited

U.S. PATENT DOCUMENTS

| | | | | |
|---|---|---|---|---|
| 4,548,568 A * | 10/1985 | Herbert | ............... | B29C 48/49 425/188 |
| 4,578,024 A | 3/1986 | Sicka et al. | | |
| 4,619,599 A * | 10/1986 | Herbert | ............... | B29C 48/2562 425/186 |
| 4,652,224 A * | 3/1987 | Golisch | ............... | B29C 48/19 425/188 |
| 4,653,994 A * | 3/1987 | Capelle | ............... | B29C 48/21 425/188 |
| 4,799,874 A * | 1/1989 | Bellmer | ............... | B29C 48/2562 425/133.5 |
| 4,824,353 A * | 4/1989 | Hirschkorn | ............... | B29C 48/49 425/190 |
| 5,061,166 A * | 10/1991 | Gohlisch | ............... | B29C 48/21 425/188 |
| 5,242,290 A * | 9/1993 | Hiraiwa | ............... | B29C 48/2562 425/188 |
| 5,851,561 A * | 12/1998 | Hirschkorn | ............... | B29C 48/2562 425/188 |
| 6,213,748 B1 * | 4/2001 | Bertram | ............... | B29C 48/49 425/188 |
| 6,273,703 B1 * | 8/2001 | Hirschkorn | ............... | B29C 48/49 425/188 |
| 6,533,565 B1 * | 3/2003 | Guillemette | ............... | B29C 48/705 425/465 |
| 6,695,606 B1 * | 2/2004 | Burg | ............... | B29C 48/35 425/464 |
| 7,704,064 B2 * | 4/2010 | Unland | ............... | B29C 48/2562 425/188 |
| 2005/0208167 A1 * | 9/2005 | You | ............... | B29C 48/705 425/133.5 |
| 2006/0018987 A1 * | 1/2006 | Hasegawa | ............... | B29C 48/07 425/192 R |
| 2011/0070325 A1 * | 3/2011 | Choi | ............... | B29C 48/307 425/505 |
| 2013/0154144 A1 * | 6/2013 | Ripple | ............... | B29C 48/92 425/131.1 |
| 2013/0156876 A1 * | 6/2013 | Schnabel | ............... | B29C 48/07 425/204 |
| 2017/0217072 A1 * | 8/2017 | Hahn | ............... | B29C 48/49 |

FOREIGN PATENT DOCUMENTS

| | | |
|---|---|---|
| JP | S59-70534 A | 4/1984 |
| JP | S61-019331 A | 1/1986 |
| JP | S61-193823 A | 8/1986 |

* cited by examiner

HEAD FOR MULTI-LAYER EXTRUSION DEVICE

TECHNICAL FIELD

The present invention relates to a head for multi-layer extrusion device.

BACKGROUND ART

Patent Document 1 below proposes a head for multi-layer extruder device. This device is a three-layer extrusion device which includes a fixed split head, a pair of first movable split heads disposed on upper and lower portions of the fixed split head, and a second movable split head disposed on at least one of the first movable split heads. A connecting plate is provided on the fixed split head, and three extruders are attached to the connecting plate.

The connecting plate is provided with three upstream-side flow paths that penetrate the connecting plate to guide elastomeric materials provided from the extruders. The head further includes three downstream-side flow paths which extends along respective boundaries between the split heads which are adjacent in up-and-down direction. The downstream-side flow paths are connected to the respective upstream-side flow paths on a one-to-one basis.

CITATION LIST

Patent Literature

Patent Document 1: Japanese Unexamined Patent Application Publication S61-19331

SUMMARY OF INVENTION

Technical Problem

In this type of device, the size of the upstream-side flow paths to be communicated with the extruders is set according to the size of the extruders required. In addition, the shape of the downstream-side flow paths is set according to the shape to be extruded by a pre-former, die, etc.

As a result, when changing the size of the extruders later, it is necessary to remove the connecting plate from the fixed split head and additionally process the upstream-side the flow paths so as to match the changed size.

However, since the connecting plate and the fixed split head have large and complicated shapes that are integrated with each other, it is difficult to process the upstream-side flow paths with high accuracy afterwards. In addition, when changing the shape of the extrusion, it is also difficult to perform additional processing the downstream-side flow paths with high accuracy. In some cases, the additional processing itself becomes difficult, and it is necessary to remake the connecting plate and the fixed split head.

The present invention has an object to provide a head of a multi-layer extrusion device that can easily and accurately respond to changes in the size of extruders and changes in the extrusion shape.

Solution to Problem

The present invention provides a head for multi-layer extrusion device having a plurality of flow paths for separately guiding elastomeric materials from a plurality of extruders to a pre-former attachment unit, the head including: a main head to which the plurality of extruders is to be connected; an upper head part positioned above the main head; and a lower head part positioned below the main head, wherein the plurality of extruders includes a first extruder and a second extruder, and the main head, at least, is detachably divided into a first head part to which the first extruder is to be connected, a second head part to which the second extruder is to be connected, a third head part connected to the first head part on a downstream side of the first head part, and a fourth head part connected to the second head part on the downstream side of the second head part.

In the head for multi-layer extrusion device according to the present invention, it is preferable that the plurality of flow paths includes a first flow path to guide an elastomeric material provided from the first extruder and a second flow path to guide an elastomeric material provided from the second extruder, the first flow path includes a first upstream-side flow path passing through the first head part and a first downstream-side flow path extending along a boundary between the third head part and the upper head part, and the second flow path includes a second upstream-side flow path passing through the second head part and a second downstream-side flow path extending along a boundary between the fourth head part and the lower head part.

In the head for multi-layer extrusion device according to the present invention, it is preferable that the main head is configured to be capable of adding detachably a fifth head part to which a third extruder is to be connected.

In the head for multi-layer extrusion device according to the present invention, it is preferable that the main head is configured to be capable of adding detachably a six head part to which a fourth extruder is to be connected.

Advantageous Effects of Invention

The head of a multi-layer extrusion device according to the present invention includes the main head to which the plurality of extruders including the first and second extruders is to be connected. The main head, at least, is detachably divided into the first head part to which the first extruder is to be connected, the second head part to which the second extruder is to be connected, the third head part connected to the first head part on a downstream side of the first head part, and the fourth head part connected to the second head part on the downstream side of the second head part. In such a head, the main head can be decomposed into at least four small parts including the first to fourth head parts, and the shape thereof can be simplified.

Thus, in this head, for example, when resizing the first extruder and/or the second extruder, the upstream-side flow paths can be processed separately with respect to the disassembled the first head part and/or the second head part, and thus workability and processing accuracy can be improved. Further, in this head, when changing the extruded shape of an extruded product, the downstream-side flow paths can be processed separately with respect to the disassembled the third head part and/or the fourth head part, and thus workability and processing accuracy can be improved.

Therefore, the head for multi-layer extrusion device according to the present invention can easily and accurately respond to changes in the extruders and changes in the extrusion shape.

DESCRIPTION OF EMBODIMENTS

Figure 1:
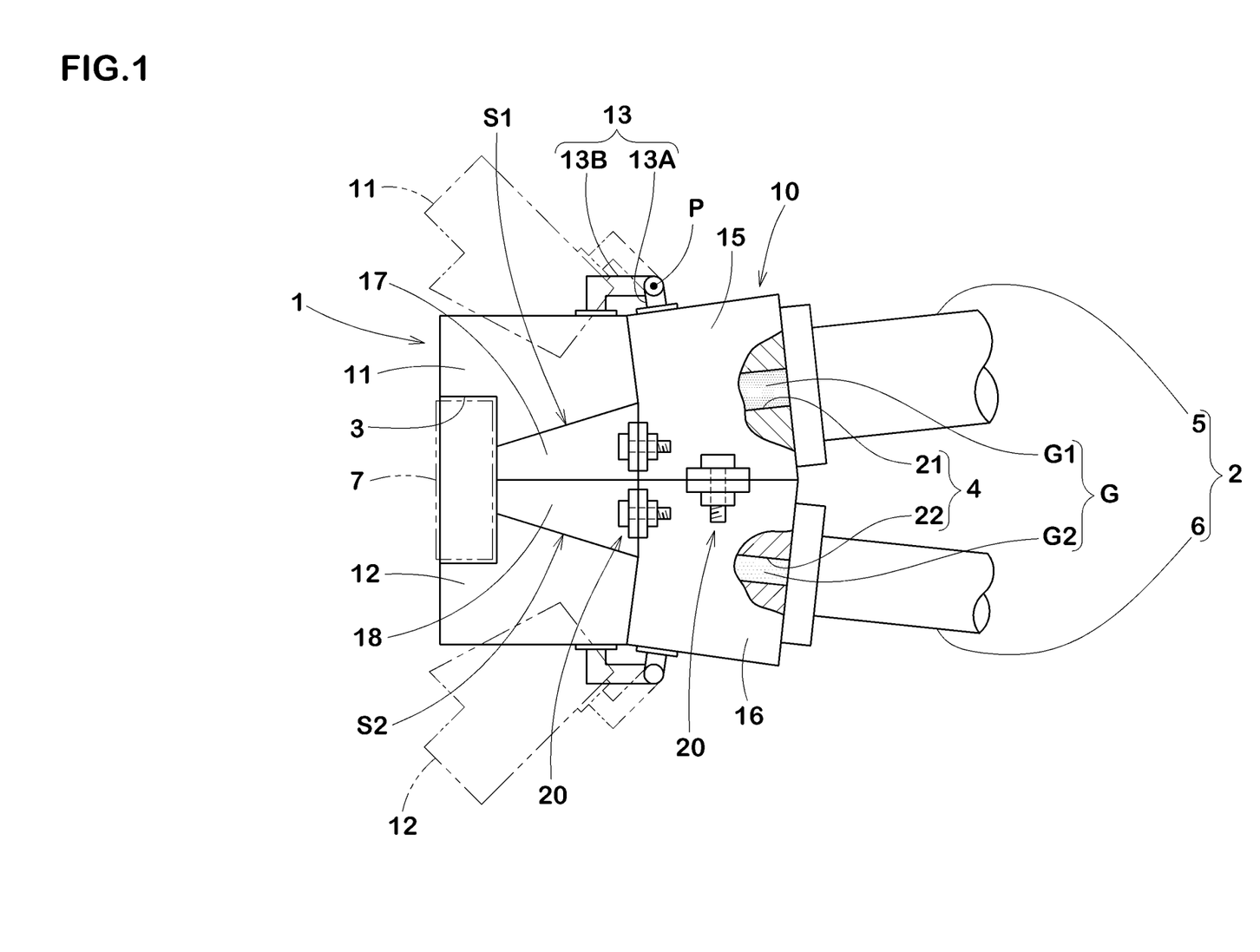
FIG. 1 is a side view of an embodiment of a head for multi-layer extrusion device according to the present invention.
Figure 2:
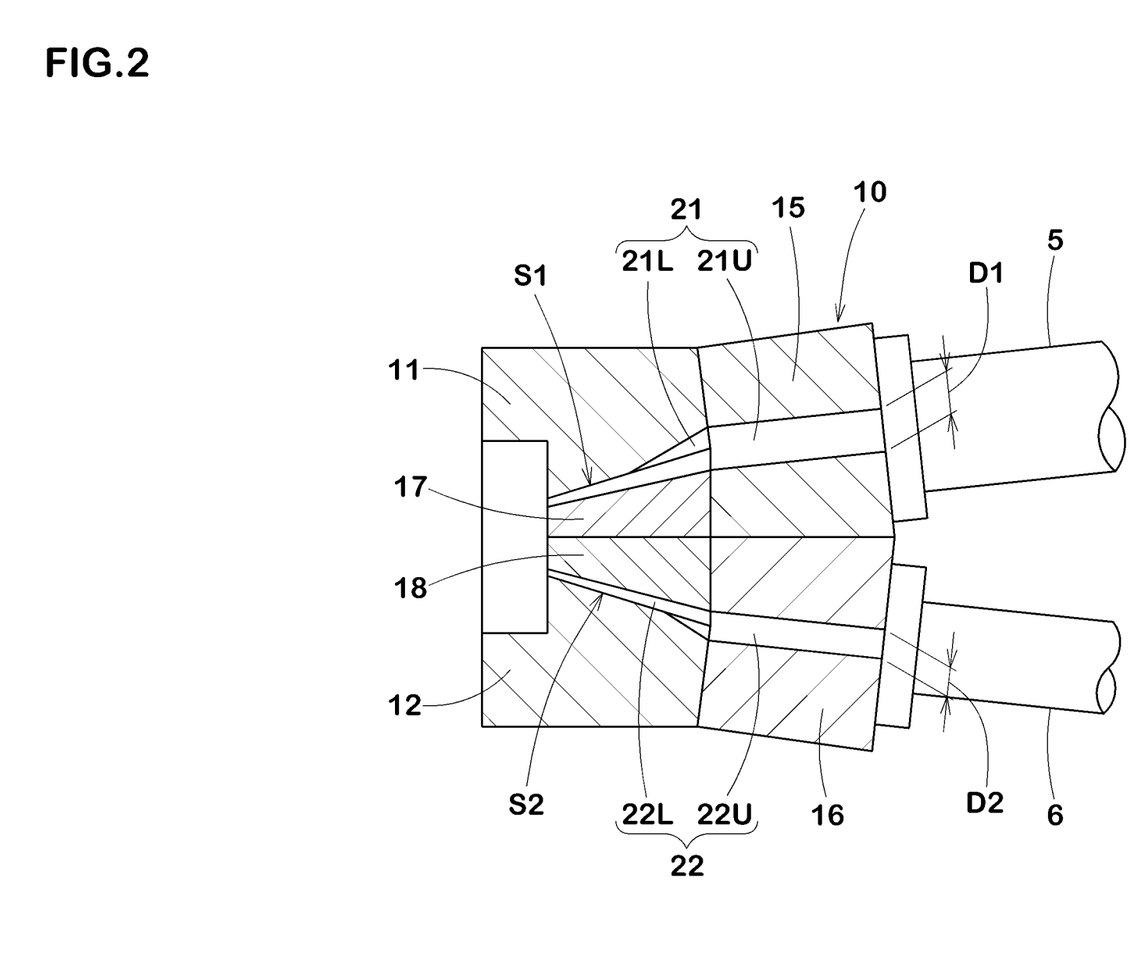
FIG. 2 is a cross-sectional view thereof.
Figure 5:
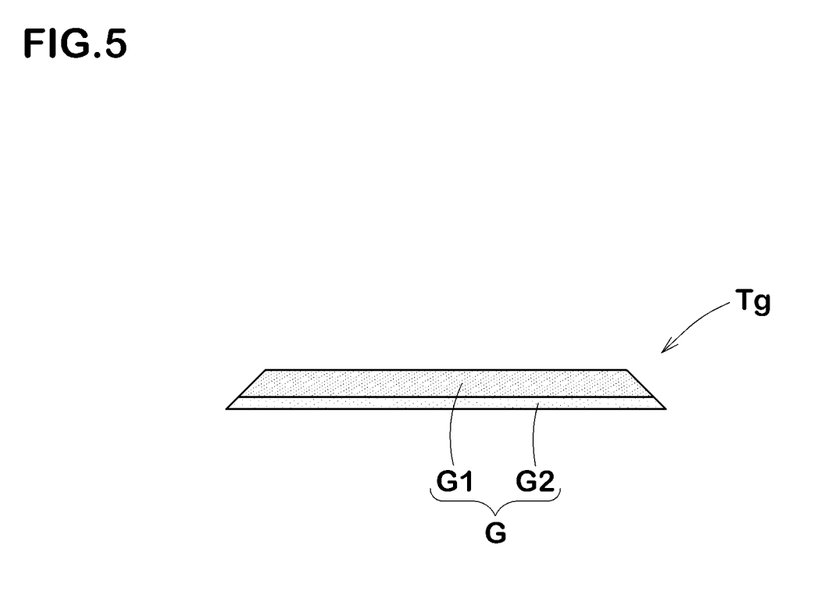
FIG. 5 is a cross-sectional view showing an example of an extruded product manufactured by a multi-layer extrusion device.

An embodiment of the present invention will be explained below with reference to the accompanying drawings. FIG. 1 and FIG. 2 show the first embodiment of a head 1 for multi-layer extrusion device (hereinafter simply referred to as the "head 1"). Further, FIG. 5 shows an example of an extruded product manufactured by the multi-layer extrusion device.

As illustrated in FIG. 1, the head 1 according to the present embodiment includes a plurality of flow paths 4 which guides elastomeric materials G separately from a plurality of extruders 2 to a pre-former attachment unit 3. A pre-former is indicated by the reference sign 7.

The plurality of extruders 2 includes a first extruder 5 and a second extruder 6. The plurality of extruders 2 according to the first embodiment consists of the first extruder 5 and the second extruder 6. The multi-layer extrusion device according to the first embodiment forms a two-layer tread rubber Tg for tires (shown in FIG. 5) using elastomeric materials G1 and G2 extruded from the first extruder 5 and the second extruder 6, respectively.

In this embodiment, as the extruders 2, so-called screw-type extruders in which a motor-driven screw shaft is housed in a cylinder is adopted. However, the extruders 2 are not limited to such an embodiment, and extruders having various known structures can be used.

The head 1 includes a main head 10 to which the extruders 2 are to be connected. The head 1 according to the first embodiment includes the main head 10, an upper head part 11 positioned above the main head 10, and a lower head part 12 positioned below the main head 10.

The upper head part 11 and the lower head part 12 are movable type heads which are supported by the main head 10. In the present embodiment, the upper head part 11 and the lower head part 12 are rotatably supported by pivot means 13 so that they can swing about fulcrum P up and down. The pivot means 13 include first pivot members 13A provided on the main head 10 side and second pivot members 13b provided on the upper head part 11 side and the lower head part 12 side. It is preferable that the first pivot members 13A is detachable from the main head 10.

The main head 10 is dividable into, at least, a first head part 15, a second head part 16, a third head part 17 and a fourth head part 18.

The first extruder 5 is connected to the back side of the first head part 15. The second extruder 6 is connected to the back side of the second head part 16. The first head part 15 and the second head part 16, for example, are detachably coupled with each other via connecting means 20 such as bolts. The connecting means 20 is not limited to the bolts, but various structures can be adopted.

The third head part 17 is positioned a downstream side of the first head part 15. The third head part 17 is detachably connected to the first head part 15 via the connecting means 20, for example. The fourth head part 18 is positioned a downstream side of the second head part 16. The fourth head part 18 is detachably connected to the second head part 16 using the connecting means 20, for example. A bottom surface of the third head part 17 and an upper surface of the fourth head part 18 are butted with each other.

The plurality of flow paths 4 includes a first flow path 21 to guide an elastomeric material G1 provided from the first extruder 5 to the pre-former attachment unit 3 and a second flow path 22 to guide an elastomeric material G2 provided from the second extruder 6 to the pre-former attachment unit 3.

As illustrated in FIG. 2, the first flow path 21 includes a first upstream-side flow path 21U and a first downstream-side flow path 21L that is in communication with the first upstream-side flow path 21U. The first upstream-side flow path 21U, for example, has a circular cross-section and extends to penetrate the first head part 15 in a back-and-forth direction. The size of the first upstream-side flow path 21U may be set according to the size of the first extruder 5. Specifically, the diameter D1 of the upstream end of the first upstream-side flow path 21U is set according to the diameter of the extrusion port (not shown) of the first extruder 5. The diameter D1 is preferably set substantially equal to the diameter of the extrusion port. In this embodiment, the first upstream-side flow path 21U has a parallel hole with a constant diameter, but the first upstream-side flow path 21U may be a tapered hole whose diameter decreases toward the downstream side.

The first downstream-side flow path 21L extends along a boundary S1 between the third head part 17 and the upper head part 11. It is preferable that the shape of the upstream end of the first downstream-side flow path 21L has the same as the shape of the downstream end of the first upstream-side flow path 21U. Further, the shape of the first downstream-side flow path 21L is set according to the shape of the extruded product (the tread rubber Tg in this embodiment). The first downstream-side flow path 21L in this embodiment gradually increases the width of the flow path while gradually decreasing the height of the flow path toward the downstream side.

The second flow path 22 includes a second upstream-side flow path 22U and a second downstream-side flow path 22L that is in communication with the second upstream-side flow path 22U. The second upstream-side flow path 22U, for example, has a circular cross-section and extends to penetrate the second head part 16 in a back-and-forth direction. The size of the second upstream-side flow path 22U may be set according to the size of the second extruder 6. Specifically, the diameter D2 of the upstream end of the second upstream-side flow path 22U is set according to the diameter of the extrusion port (not shown) of the second extruder 6. The diameter D2 is preferably set substantially equal to the diameter of the extrusion port. In this embodiment, the second upstream-side flow path 22U has a parallel hole with a constant diameter, but the second upstream-side flow path 22U may be a tapered hole whose diameter decreases toward the downstream side.

The second downstream-side flow path 22L extends along a boundary S2 between the fourth head part 18 and the lower head part 12. It is preferable that the shape of the upstream end of the second downstream-side flow path 22L has the same as the shape of the downstream end of the second upstream-side flow path 22U. Further, the shape of the second downstream-side flow path 22L is set according to the shape of the extruded product (the tread rubber Tg in this embodiment). The second downstream-side flow path 22L in this embodiment gradually increases the width of the flow path while gradually decreasing the height of the flow path toward the downstream side.

In such a head 1, the main head 10 can be decomposed into at least the first head part 15 to the fourth head part 18, simplifying the shape. Thus, in this head 1, when resizing the extruders 2, the first upstream-side flow path 21U and/or the second upstream-side flow path 22U can be processed separately with respect to the disassembled first head part 15 and/or second head part 16, and workability and processing accuracy can be improved. Further, in this head 1, when changing the shape (extruded shape) of an extruded product, the first downstream-side flow path 21L and/or the second downstream-side flow path 22L can be processed separately with respect to the disassembled third head part 17 and/or fourth head part 18, and workability and processing accuracy can be improved.

Therefore, the head 1 can easily and accurately respond to changes in the extruders 2 and changes in the extrusion shape.

The head 1 receives a strong tensile/compressive stress due to the internal pressure. For this reason, it is preferable to position and connect the head parts using keys (not shown) having sufficient strength to prevent misalignment between the head parts. Note that dividing the head 1 into multiple head parts while avoiding the occurrence of rubber leakage can be carried out without problems due to improvements in the performance of processing machines.

Figure 3:
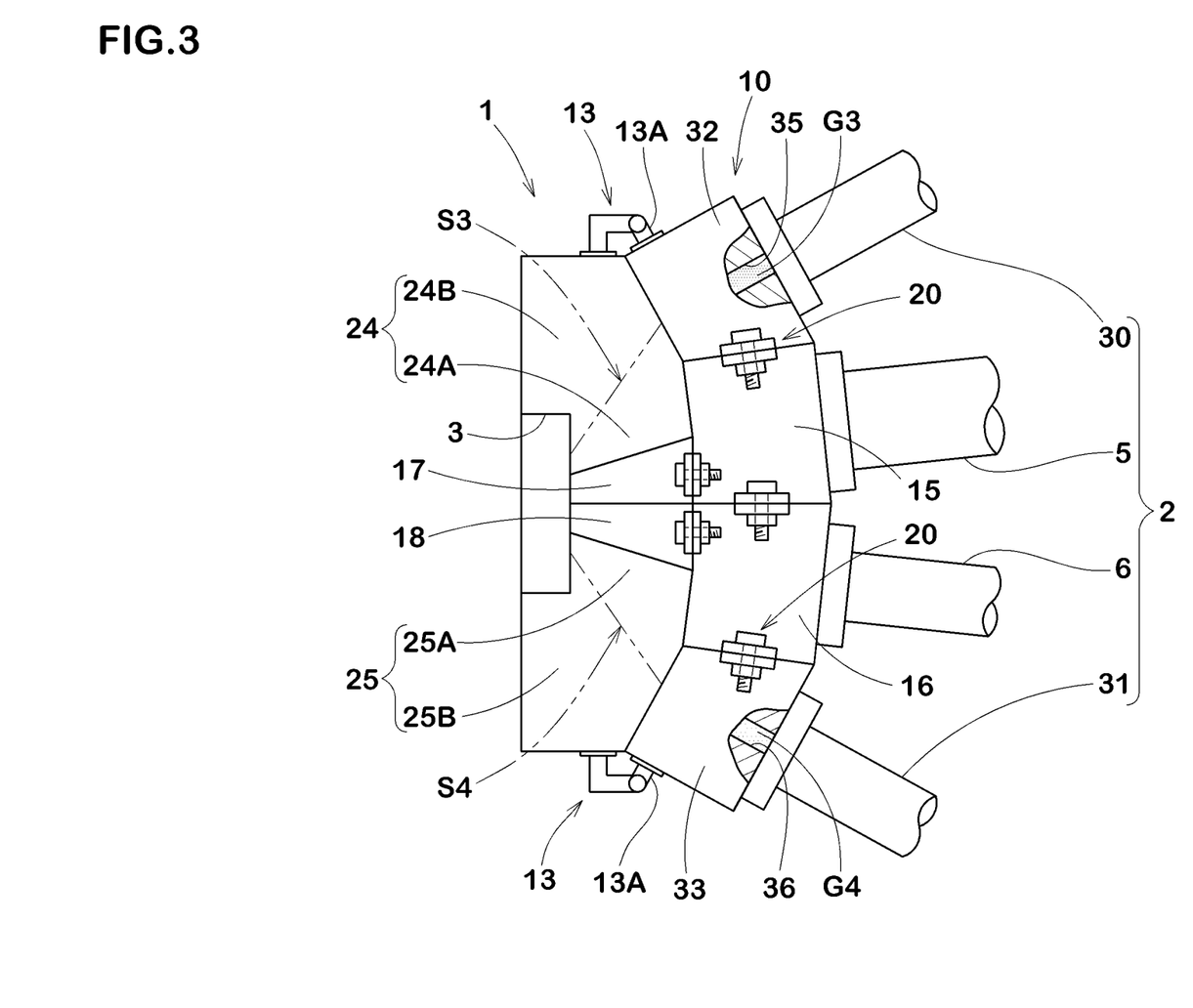
FIG. 3 is a side view of another embodiment of the head for multi-layer extrusion device according to the present invention.
Figure 4:
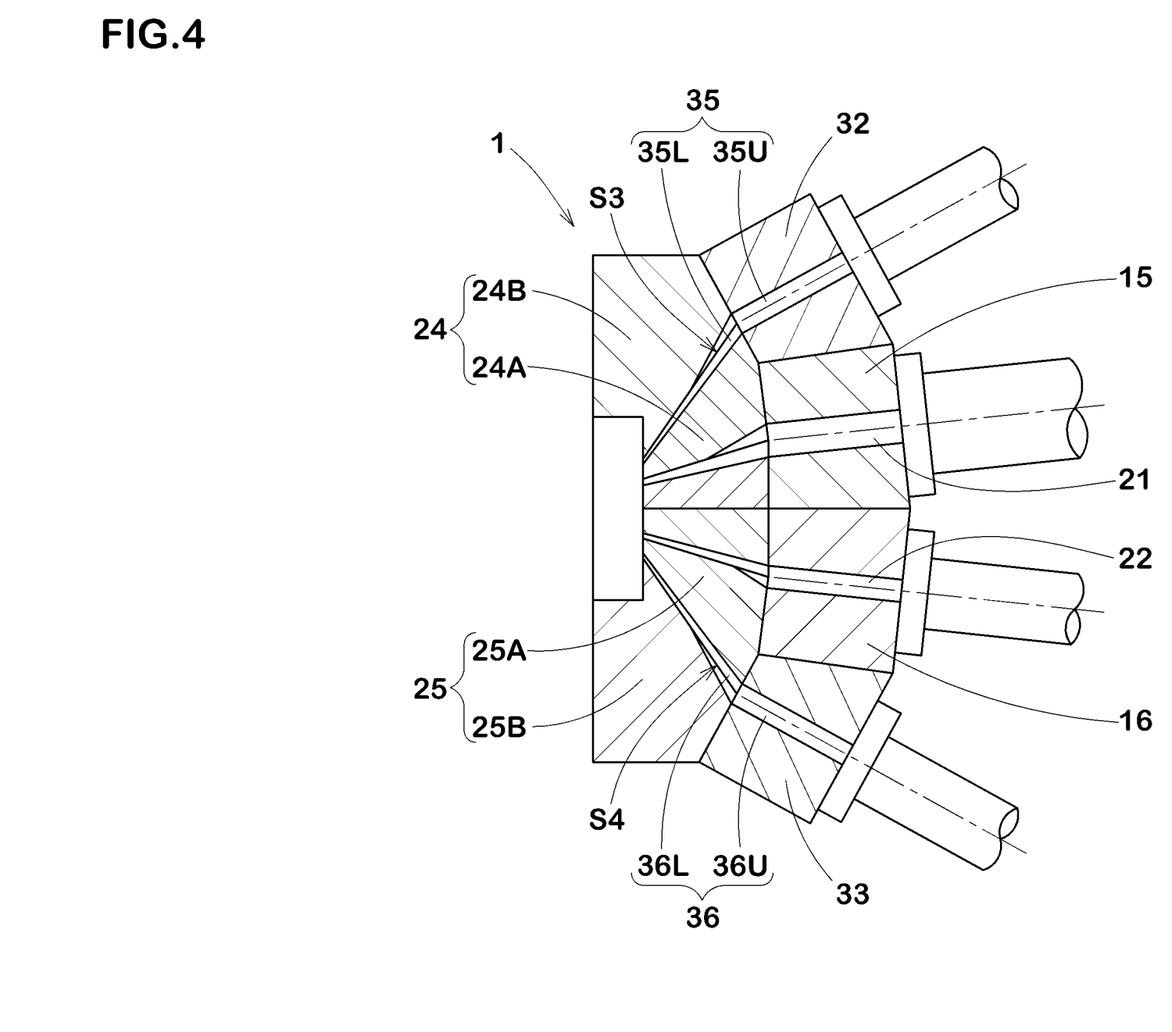
FIG. 4 is a cross-sectional view thereof.

FIG. 3 and FIG. 4 show the second embodiment of the head 1. As illustrated in FIG. 3 and FIG. 4, the plurality of extruders 2 according to the present embodiment includes the first extruder 5, the second extruder 6, a third extruder 30, and a fourth extruder 31.

Further, the main head 10 includes the first head part 15, the second head part 16, the third head part 17, the fourth head part 18, a fifth head part 32 to which the third extruder 30 is to be connected, and a sixth head part 33 to which the fourth extruder 31 is to be connected.

In this second embodiment, the fifth head part 32 and the sixth head part 33 are optionally added to the main head 10 of the first embodiment. Specifically, the fifth head part 32 is positioned above the first head part 15 of the first embodiment. The fifth head part 32 is detachably connected to the first head part 15 via the connecting means 20, for example. In this case, the first pivot member 13A is replaced from the first head part 15 to the fifth head part 32.

Further, the sixth head part 33 is positioned below the second head part 16 of the first embodiment. The sixth head part 33 is detachably connected to the second head part 16 via the connecting means 20, for example. In this case, the first pivot member 13A is replaced from the second head part 16 to the sixth head part 33.

Furthermore, the fifth head part 32 and the sixth head part 33 support an upper head part 24 and a lower head part 25, respectively, via the pivot means 13. The upper head part 24 and the lower head part 25 are different in shape from the upper head part 11 and the lower head part 12 of the first embodiment.

The plurality of flow paths 4 includes the first flow path 21 and the second flow path 22 of the first embodiment, a third flow path 35 to guide an elastomeric material G3 provided from the third extruder 30 to the pre-former attachment unit 3, and a fourth flow path 36 to guide an elastomeric material G4 provided from the fourth extruder 31 to the pre-former attachment unit 3.

As illustrated in FIG. 4, the third flow path 35 includes a third upstream-side flow path 35U and a third downstream-side flow path 35L that is in communication with the third upstream-side flow path 35U. The third upstream-side flow path 35U, for example, has a circular cross-section and extends to penetrate the fifth head part 32 in the back-and-forth direction.

The third downstream-side flow path 35L passes through the upper head part 24. In the present embodiment, the upper head part 24 is dividable into a first upper head part 24A on the below side and a second upper head part 24B on the upper side. In the second embodiment, the third downstream-side flow path 35L extends along a boundary S3 between the first upper head part 24A and the second upper head part 24B. The first upper head part 24A and the second upper head part 24B, for example, are detachably connected with each other via the connecting means 20 (not illustrated).

The fourth flow path 36 includes a fourth upstream-side flow path 36U and a fourth downstream-side flow path 36L that is in communication with the fourth upstream-side flow path 36U. The fourth upstream-side flow path 36U, for example, has a circular cross-section and extends to penetrate the sixth head part 33 in the back-and-forth direction.

The fourth downstream-side flow path 36L passes through the lower head part 25. In the present embodiment, the lower head part 25 is dividable into a first lower head part 25A on the upper side and a second lower head part 25B on the below side. In the second embodiment, the fourth downstream-side flow path 36L extends along a boundary S4 between the first lower head part 25A and the second lower head part 25B. The first lower head part 25A and the second lower head part 25B, for example, are detachably connected with each other via the connecting means 20 (not illustrated).

Thus, the head 1 can detachably add the fifth head part 32 and/or the sixth head part 33. For this reason, the head 1 can also accommodate further multi-layering of extruded products with minimal changes.

In such a head 1, in addition to the fifth head part 32 and the sixth head part 33, further additional head parts can be added.

Conventionally, heads of multi-layer extrusion devices were not considered for expandability and were exclusively for the required specification, so it was necessary to prepare a head for each required specification. On the other hand, the head 1 according to the present embodiment can also be used as follows.

The head 1 may be prepared as a divided structure that assumes expansion to 4 to 6 layers, for example. Then, for example, when forming a two or three-layer extruded product having predetermined required specifications, some head parts that meet the required specifications are selected from a plurality of types of head parts prepared in advance and then are assembled to form a main head 10. As a result, main heads 10 have one or more common head parts, capable of reducing inventory thereof and contributing to cost reduction.

While the particularly preferable embodiments in accordance with the present invention have been described in detail, the present invention is not limited to the illustrated embodiments, but can be modified and carried out in various aspects.

REFERENCE SIGNS LIST 1 head for multi-layer extrusion device
2 extruder
3 pre-former attachment unit
4 flow path
5 first extruder 6 second extruder
10 main head
11, 24 upper head part
12, 25 lower head part
15 first head part
16 the second head part
17 third head part
18 fourth head part
21 first flow path
21U first upstream-side flow path
21L first downstream-side flow path
22 second flow path
22U second upstream-side flow path
22L second downstream-side flow path
30 third extruder
31 fourth extruder
32 fifth extruder
33 sixth extruder
G, G1, G2, G3, G4 elastomeric material
S1, S2, S3, S4 boundary

The invention claimed is:

1. A head for multi-layer extrusion device having a plurality of flow paths for separately guiding elastomeric materials from a plurality of extruders to a pre-former attachment unit, the head comprising:
a main head to which the plurality of extruders is to be connected;
an upper head part positioned above the main head; and
a lower head part positioned below the main head, wherein
the plurality of extruders comprises a first extruder and a second extruder,
the main head, at least, is detachably divided into a first head part to which the first extruder is to be connected, a second head part to which the second extruder is to be connected, a third head part connected to the first head part on a downstream side of the first head part, and a fourth head part connected to the second head part on the downstream side of the second head part, and
a bottom surface of the third head part and an upper surface of the fourth head part are butted with each other.

2. The head for multi-layer extrusion device as set forth in claim 1, wherein
the plurality of flow paths comprises a first flow path to guide an elastomeric material provided from the first extruder and a second flow path to guide an elastomeric material provided from the second extruder,
the first flow path comprises a first upstream-side flow path passing through the first head part and a first downstream-side flow path extending along a boundary between the third head part and the upper head part, and
the second flow path comprises a second upstream-side flow path passing through the second head part and a second downstream-side flow path extending along a boundary between the fourth head part and the lower head part.

3. The head for multi-layer extrusion device as set forth in claim 1, wherein
the main head is configured to be capable of adding detachably a fifth head part to which a third extruder is to be connected.

4. The head for multi-layer extrusion device as set forth in claim 3, wherein
the main head is configured to be capable of adding detachably a six head part to which a fourth extruder is to be connected.

5. A head for multi-layer extrusion device having a plurality of flow paths for separately guiding elastomeric materials from a plurality of extruders to a pre-former attachment unit, the head comprising:
a main head to which the plurality of extruders is to be connected;
an upper head part positioned above the main head; and
a lower head part positioned below the main head, wherein
the plurality of extruders comprises a first extruder and a second extruder,
the main head, at least, is detachably divided into a first head part to which the first extruder is to be directly connected, a second head part to which the second extruder is to be directly connected, a third head part connected to the first head part on a downstream side of the first head part, and a fourth head part connected to the second head part on the downstream side of the second head part, and
the upper head part is separable from the third head part.

6. The head for multi-layer extrusion device as set forth in claim 1, wherein the first head part and the second head part are detachably coupled with each other via connecting means including bolts.

7. The head for multi-layer extrusion device as set forth in claim 6, wherein bolts extend in a vertical direction that is perpendicular to an extrusion direction of the elastomeric material.

8. The head for multi-layer extrusion device as set forth in claim 1, wherein
the third head part is positioned at a downstream side of the first head part, and
the third head part is detachably connected to the first head part via a first connecting means including bolts.

9. The head for multi-layer extrusion device as set forth in claim 8, wherein
the fourth head part is positioned at a downstream side of the second head part, and
the fourth head part is detachably connected to the second head part using a second connecting means including bolts.

10. The head for multi-layer extrusion device as set forth in claim 5, wherein the first head part and the second head part are detachably coupled with each other via connecting means including bolts.

11. The head for multi-layer extrusion device as set forth in claim 10, wherein bolts extend in a vertical direction that is perpendicular to an extrusion direction of the elastomeric material.

12. The head for multi-layer extrusion device as set forth in claim 5, wherein
the third head part is positioned at a downstream side of the first head part, and
the third head part is detachably connected to the first head part via a first connecting means including bolts.

13. The head for multi-layer extrusion device as set forth in claim 12, wherein
the fourth head part is positioned at a downstream side of the second head part, and
the fourth head part is detachably connected to the second head part using a second connecting means including bolts.

* * * * *